Figure 1:
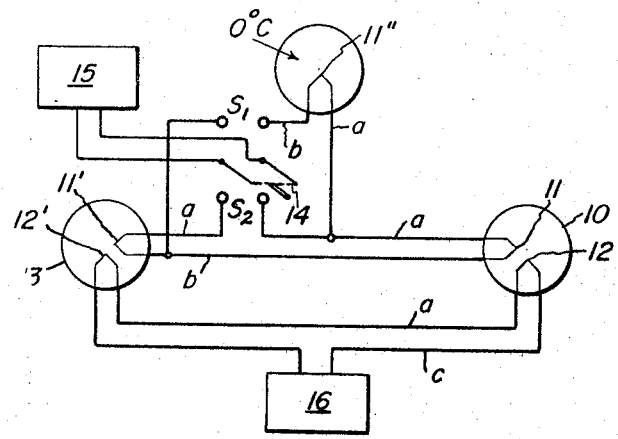

July 25, 1967 — H. M. STRONG — 3,332,286

THERMOCOUPLE PRESSURE GAUGE

Filed Sept. 2, 1965

Inventor:
Herbert M. Strong,
by Leo J. MaSon
His Attorney

United States Patent Office 3,332,286
Patented July 25, 1967

3,332,286
THERMOCOUPLE PRESSURE GAUGE
Herbert M. Strong, Schenectady, N.Y., assignor to General Electric Company, a corporation of New York
Filed Sept. 2, 1965, Ser. No. 484,709
7 Claims. (Cl. 73—399)

This invention relates generally to the measuring and testing art and is more particularly concerned with novel means for the accurate measurement of extreme pressures such as are encountered during the application of various materials to very high pressure and temperature conditions in superpressure apparatus.

Investigations into the behavior of materials under the influence of superpressures and elevated temperatures have received considerable emphasis during the past decade and the increasing sophistication in apparatus and methods employed has shown with ever-increasing clarity the necessity for means for the rapid accurate determination of pressure during actual superpressure operations. It has been suggested by Dr. F. P. Bundy in his article, "Effective Pressure on EMF of Thermocouples" (Journal of Applied Physics, vol. 32, No. 3, 483–488, March 1961), that the pressure in the pressure chamber of a superpressure apparatus can be deduced by employing a multiple-wire thermocouple set in the pressure chamber. At elevated pressures the various thermocouple combinations provide different readings representing various apparent temperature values. In the above-identified article one of the combinations selected is to be effected by pressure only a relatively small amount and is to serve as a standard. It is then postulated that the pressure in the pressure cell can be deduced from the deviation of the readings of the other thermocouple from the standard. Of course, it would appear that thermocouple pairs can also be used in which both kinds of thermocouples have EMF outputs, which deviate with pressure, but by different amounts. The relationship between their simultaneous readings at high pressure is a function of pressure and can be used to determine pressure. In spite of this suggestion, no device or mechanism has yet been offered to the art to the knowledge of this applicant (prior to this disclosure), which has made it possible to measure pressure at the time of its application in apparatus applying both high pressure and high temperature. Work has, however, been done determining the pressure errors in thermocouples as, for example, has been described in the article "Pressure Dependence of the EMF of Thermocouples to 1300° C. and 50K Bar" by R. E. Hanneman and H. M. Strong (Journal of Applied Physics, vol. 36, No. 2, 523–528, February 1965). Generally, in the conduct of superpressure investigations complete reliance is placed upon precalibration methods, which use first order phase transformations of standard materials at or near room temperature. As a result large pressure variations may go undetected.

It is recognized that the pressure EMF susceptible of detection, when a thermoelectric material is subjected to a temperature gradient within a high pressure vessel, is subject to considerable error. The magnitude of the error depends upon the thermoelectric materials, the pressure gradients and the temperature gradients employed, of course, but the most significant factor responsible for this error is the fact that the pressure EMF most usually has a magnitude ranging from only about a few hundredths to $\frac{1}{10}$ of a millivolt, while the total EMF output of any given thermocouple at operating temperatures may be in the range of from about 10 to about 60 millivolts. Therefore, in order to read out the electrical output of the thermocouples, potentiometers employed would have to be capable of indicating a range on the scale thereof up to about 100 millivolts. As a result of having to display values of such relatively large magnitude it would be necessary to observe and/or record small differences between large numbers and considerable accuracy would be sacrificed by this limitation. Unfortunately, this error would be further increased by the advent of other less significant effects as, for example, are caused by the deformation of the thermocouple wires in the pressure seal (gasket) region of the pressure apparatus and by the effect of the temperature gradient that occurs in the pressure gradient region along the pressure seal region.

It is, therefore, a prime object of this invention to provide means for accurately determining the difference in pressure EMF effects of a pair of thermocouples having different pressure EMF effects, whereby the pressures in a high pressure chamber may be rapidly and accurately detected during high pressure, high temperature operating conditions.

The above-mentioned object together with other objects and features of the invention, which will become apparent to those skilled in the art as the disclosure is made in the following detailed description, is accomplished by locating in the high pressure cell and also in a small furnace located exterior to the superpressure apparatus maintained at atmospheric pressure, two kinds of thermocouple junctions having different pressure EMF effects. The thermocouples are so connected electrically (in series opposition) that the temperature EMF's generated in the exterior furnace would be expected to cancel the temperature EMF's generated in the high pressure cell, when the exterior furnace temperature equals the apparent temperature within the high pressure cell. The term "apparent temperature EMF" is employed to indicate that the EMF generated in thermocouples exposed both to elevated temperature and high pressure reflects the algebraic sum of the actual temperature EMF and the EMF error effect of pressure acting on the thermocouple. Because the pressure EMF effects so generated will vary with the application of different perssures and also will vary for the various junctions at any given elevated pressure, only one of the temperature EMF's at a time may be exactly cancelled out by the temperature EMF from the exterior furnace.

By this method, then, the one thermocouple, whose EMF output is selected to be cancelled out, becomes a reference (or zero value). When this one thermocouple EMF output has been "bucked out" or cancelled out, the other junction will then indicate a value of pressure-generated EMF having a magnitude ranging from about a few hundredths to a few tenths of a millivolt, which reflects the difference between the pressure generated EMF's of the two junctions. The magnitude of this difference depends on the temperature gradient to which the thermocouples are subjected within the pressurized region and the pressure prevailing in the cell. By plotting values of the difference in pressure EMF's as a function of apparent temperature in the pressure cell for various cell pressures, a series of graphs are obtained for a given cell configuration wherein a particular combination of thermocouple junctions is employed. Once these graphs have been plotted, all that is required for the determination of pressure values in the cell during subsequent high pressure high temperature operation is the establishment of the difference in pressure EMF and the apparent cell temperature. Having these values as coordinates, the value of the pressure is quickly obtained from the aforementioned series of graphs. Also the values of pressure and temperature simultaneously applied may be detected in this way.

Figure 2:
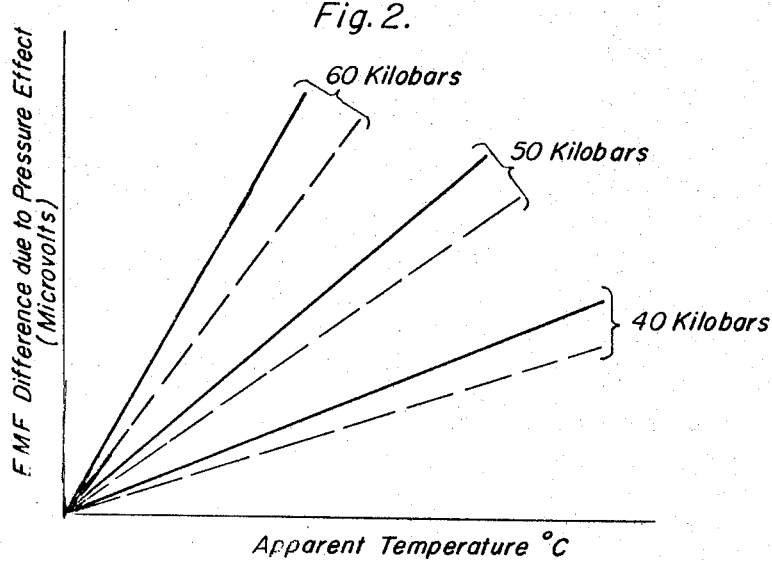

A preferred embodiment of the invention is illustrated in the accompanying sheet of drawing in which:

FIG. 1 is a schematic representation of apparatus constituting a high temperature high pressure measuring device, and FIG. 2 is a display of typical graphs obtained by plotting the difference in pressure EMF obtained at various apparent temperature readings, using a given pair of thermocouples.

In the device shown schematically in FIG. 1, the pressure is to be measured in reaction vessel 10. Thermocouples 11 and 12, which are of two different compositions having different pressure EMF effects are shown arranged in reaction vessel 10. Reaction vessel 10, which is schematically represented could be any of a variety of reaction vessel configurations as, for example, are described in U.S. 2,941,251—Strong, U.S. 2,944,289—Hall, U.S. 3,030,662—Strong, and U.S. 3,088,170—Strong. In general, such reaction vessels are employed in the superpressure art as containing vessels or enclosures within which specimen materials are positioned in order to subject such materials to high pressure, high temperature conditions either for the production or manufacture of a new article or form of matter or for research investigation into the behavior of materials under the aforementioned conditions.

By way of example, thermocouple 11 may be a platinum(a)-platinum 10 rhodium(b) thermocouple, while thermocouple 12 is a platinum(a)-palladium(c) thermocouple. The letters $a$, $b$ and $c$ refer to leads of the materials so designated in FIG. 1.

Other useful combinations of thermocouples are a platinum-platinum 10 rhodium thermocouple in combination with a gold-platinum 40 rhodium thermocouple or a platinum-platinum 10 rhodium thermocouple in combination with an iridium-platinum 40 rhodium thermocouple. Still other possible thermocouples that may be employed in various combinations are chromel-alumel, iron-constantan, platinum-constantan, and platinum-platinum 13 rhodium.

As shown, junctions 11' and 12' of the thermocouples 11, 12, respectively, are arranged in furnace 13, where they will be maintained at atmospheric pressure, while thermocouples 11, 12 are subjected to the high pressures selectively applied with the superpressure apparatus (not shown) to the reaction vessel 10, which is placed therein. Thus, the pressure conditions to which the pairs of thermocouples are subjected will be different and the temperatures to which they will be exposed may be adjusted as described below.

Electrical connections between junctions 11, 11' and 12, 12' are such that the temperature EMF (at atmospheric pressure) of the junction 11' will exactly cancel out the total EMF output generated by junction 11 in the reaction cell 10, when the temperature of the furnace 13 is made equal to the apparent temperature in the reaction cell 10.

Therefore, by setting the temperature in furnace 13 so that with switch 14 in $S_2$ position the reading on potentiometer recorder 15 is zero, the EMF outputs from thermocouples 11 and 11' just cancel each other out. By moving switch 14 to the $S_1$ position the reading on potentiometer 15 will then reflect the apparent temperature of pressure vessel 10. Thermocouple junction 11'', which is identical to thermocouple 11, is kept at 0° C. and at atmospheric pressure as a reference standard. With furnace 13 at the proper temperature to cancel out the total EMF output of thermocouple 11, which is at some given pressure in cell 10, there will be an EMF recorded on potentiometer recorder 16 (for thermocouples 12, 12'). The value of the recorded EMF will be either positive or negative relative to the zero value established for thermocouples 11, 11' depending on the nature of the materials ($a$, $c$) forming junctions 12, 12'. This value of EMF represents the difference in millivolts between the EMF's due to the effect of pressure on thermocouples 11 and 12.

In this manner, the very large EMF outputs due to temperature effects do not register and are not read. Therefore, the very small values for the EMF caused by the effect of pressure on thermocouples 11 and 12 can be accurately detected, because a potentiometer can be used which is designed to read accurately to a microvolt.

External furnace 13 should be constructed so as to have high heat loss characteristics, such as are characteristic of the high pressure cell 10. This high heat loss enables rapid attainment of thermal equilibrium therein.

Graphs, such as are illustrated in FIG. 2 as dashed lines, represent the pressure EMF curves prepared in the calibration of a given high pressure apparatus. Because these dashed line graphs reflect the effects of the temperature gradient and the pressure gradient in the gasket region of the given apparatus, the comparable absolute values may be determined by correcting for these factors, thereby producing graphs such as are shown in solid lines in FIG. 2. Such corrected curves giving absolute values enable the comparison of results with those obtained on other pieces of apparatus, which have error effects of their own, which most likely are of different magnitude than those for the particular given apparatus.

The dashed line curves in FIG. 2 are plotted using data accumulated in the manner described above, i.e. differences in pressure EMF for particular apparent temperature gradients. After such calibration curves for specific pressures have been prepared using a particular combination of thermocouple elements, then by subsequent use of these same thermocouple elements (or elements identical thereto) and the combination of potentiometers, switches, furnace and constant temperature junction disclosed herein, the pressure EMF and, thereby, the cell pressure can be accurately determined as these pressures are being applied to an accuracy of about ±1 kilobar (kb.).

This invention thereby offers the promise of more accurate control of superpressure technology such as will enable clearer understanding of the occurrences during diamond production from non-diamond carbon and, perhaps, result in the production of larger, more perfect diamond material.

What I claim as new and desire to secure by Letters Patent of the United States is:

1. Apparatus for in situ measurement of pressure during high pressure operations conducted under elevated temperature conditions comprising in combination:
   (a) at least two first thermocouple junctions,
   (b) a pair of second thermocouple junctions,
      (1) said first and second thermocouple junctions being of compositions having different EMF outputs at the same elevated pressure and temperature,
   (c) first means for electrically connecting a pair of said first thermocouple junctions in series opposition,
   (d) second means for electrically connecting said pair of second thermocouple junctions in series opposition,
   (e) first voltage measuring means connected to said first means to detect any net unbalanced voltage between said pair of first thermocouple junctions,
   (f) second voltage measuring means connected to said second means to detect any net unbalanced voltage between said pair of second thermocouple junctions, and
   (g) heating means for simultaneously raising the temperature of one of the thermocouple junctions from each of said pairs of thermocouple junctions whereby the other of the thermocouple junctions from each of said pairs of thermocouple junctions may be simultaneously subjected to elevated pressure and temperature conditions and the difference in EMF outputs therefrom due to the elevated pressure may be detected.

2. Pressure measuring apparatus substantially as recited in claim 1 wherein an additional one of said first thermocouple junctions is connected in series opposition with the pair of first thermocouple junctions, means are provided for selectively connecting the first voltage measuring means in series therewith and means are provided for maintaining said additional one of said first thermocouple junctions at a fixed low temperature.

3. Pressure measuring apparatus substantially as recited in claim 1 wherein the first thermocouple junctions are platinum-platinum 10 rhodium and the second thermocouple junctions are platinum-palladium.

4. Pressure measuring apparatus substantially as recited in claim 1 wherein the voltage measuring means are recording potentiometers.

5. Pressure measuring apparatus substantially as recited in claim 4 wherein one of said voltage measuring means has a full scale deflection of one tenth of a millivolt.

6. A method for measuring pressure in situ in the reaction cell of a high pressure apparatus under high pressure, high temperature conditions comprising the steps of:
  (a) locating within the reaction cell at least two thermocouple junctions of compositions having different EMF outputs at the same elevated pressure and temperature,
  (b) opposing the EMF output of each of the thermocouple junctions with an EMF equal to the EMF output of one of said thermocouple junctions such that the net EMF output of said one thermocouple junction is zero,
  (c) measuring the remaining EMF output from at least one of the other thermocouple junctions, said value of EMF at a given temperature being proportional to the value of the pressure being applied within the reaction vessel.

7. The method of measuring the pressure in a superpressure apparatus substantially as recited in claim 6 wherein the temperature in said reaction vessel is selectively detected from the EMF output of the one thermocouple junction.

References Cited

"Effective Pressure on EMF of Thermocouples" (Journal of Applied Physics, vol. 32, No. 483–488, March 1961) by F. P. Bundy.

LOUIS R. PRINCE, *Primary Examiner.*

D. O. WOODIEL, *Examiner.*